United States Patent
Gao et al.

(10) Patent No.: US 11,615,509 B2
(45) Date of Patent: Mar. 28, 2023

(54) PICTURE PROCESSING METHOD AND DEVICE

(71) Applicants: BEIJING BOE OPTOELECTRONICS TECHNOLOGY CO., LTD., Beijing (CN); BOE TECHNOLOGY GROUP CO., LTD, Beijing (CN)

(72) Inventors: Bo Gao, Beijing (CN); Yue Li, Beijing (CN); Tiankuo Shi, Beijing (CN); Yafei Li, Beijing (CN); Wei Sun, Beijing (CN); Zhihua Ji, Beijing (CN); Jinxing Liu, Beijing (CN); Zijiao Xue, Beijing (CN); Xiangyi Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 965 days.

(21) Appl. No.: 16/325,930

(22) PCT Filed: Sep. 11, 2018

(86) PCT No.: PCT/CN2018/105040
§ 371 (c)(1),
(2) Date: Feb. 15, 2019

(87) PCT Pub. No.: WO2019/109699
PCT Pub. Date: Jun. 13, 2019

(65) Prior Publication Data
US 2021/0366083 A1   Nov. 25, 2021

(30) Foreign Application Priority Data
Dec. 8, 2017 (CN) .......................... 201711298687.1

(51) Int. Cl.
*G06T 3/40* (2006.01)
*G06T 5/00* (2006.01)
(Continued)

(52) U.S. Cl.
CPC .............. *G06T 3/4076* (2013.01); *G06T 1/20* (2013.01); *G06T 5/006* (2013.01); *G06T 5/50* (2013.01); *G06T 2207/20221* (2013.01)

(58) Field of Classification Search
CPC ....... G06T 1/20; G06T 3/4053; G06T 3/4061; G06T 3/4069; G06T 3/4076;
(Continued)

(56) References Cited

U.S. PATENT DOCUMENTS 6,362,827 B1 * 3/2002 Ohba ....................... G09G 5/14
345/572
6,657,603 B1 * 12/2003 Demetrescu ........... G09G 3/002
345/32
(Continued)

FOREIGN PATENT DOCUMENTS

| CN | 105404393 A | 3/2016 |
|---|---|---|
| CN | 105892683 A | 8/2016 |

(Continued)

OTHER PUBLICATIONS

International Search Report and Written Opinion dated Nov. 29, 2018.

*Primary Examiner* — Andrew M Moyer
*Assistant Examiner* — Stephen M Brinich
(74) *Attorney, Agent, or Firm* — Dilworth & Barrese, LLP.; Michael J. Musella, Esq.

(57) ABSTRACT

The present disclosure provides a picture processing method and device, including: an integrated circuit chip IC receiving a to-be-processed picture sent by a graphics processor GPU; the IC pre-processing the to-be-processed picture; the IC
(Continued)

performing counter-distortion process on the pre-processed picture; and the IC outputting the picture which is subjected to the counter-distortion process for display.

19 Claims, 9 Drawing Sheets

(51) Int. Cl.
*G06T 5/50* (2006.01)
*G06T 1/20* (2006.01)

(58) Field of Classification Search
CPC ..... G06T 3/4084; G06T 3/4092; G06T 5/006; G06T 5/50; G06T 2207/20212; G06T 2207/20216; G06T 2207/20221; G06T 2207/20224; G06T 2207/20228
USPC .......................... 382/298–300, 276, 284, 293
See application file for complete search history.

(56) References Cited

U.S. PATENT DOCUMENTS

| | | | |
|---|---|---|---|
| 10,349,069 B2* | 7/2019 | Wang | H04N 19/42 |
| 2011/0026849 A1* | 2/2011 | Kameyama | G06K 9/00308 |
| | | | 382/260 |
| 2015/0154766 A1* | 6/2015 | Goshen | G06T 5/002 |
| | | | 382/131 |
| 2015/0363641 A1* | 12/2015 | Navulur | G06K 9/40 |
| | | | 382/113 |
| 2017/0003750 A1 | 1/2017 | Li | |
| 2017/0308988 A1 | 10/2017 | Li et al. | |

FOREIGN PATENT DOCUMENTS

| | | |
|---|---|---|
| CN | 105979243 A | 9/2016 |
| CN | 106886974 A | 6/2017 |
| CN | 107945138 A | 4/2018 |
| CN | 108241211 A | 7/2018 |
| WO | 2016195857 A1 | 12/2016 |
| WO | 2017185622 A1 | 11/2017 |

\* cited by examiner

| 1 | 2 | 3 | 4 |
|---|---|---|---|
| 5 | 6 | 7 | 8 |
| 9 | 10 | 11 | 12 |
| 13 | 14 | 15 | 16 |

| 1 | 1 | 1 | 1 |
|---|---|---|---|
| 1 | 1 | 1 | 1 |
| 1 | 1 | 1 | 1 |
| 1 | 1 | 1 | 1 |

| F1 | A1 | F2 |
|----|----|----|
| C1 | B  | C2 |
| F4 | A2 | F3 |

Fig. 8A

| F1 | A1 | F2 |
|----|----|----|
| C1 | B  | C2 |
| F4 | A2 | F3 |

Fig. 8B

| F1 | A1 | F2 |
|----|----|----|
| C1 | B  | C2 |
| F4 | A2 | F3 |

PICTURE PROCESSING METHOD AND DEVICE

TECHNICAL FIELD

The present disclosure relates to the field of picture processing, and more particular to picture processing method and device.

BACKGCIRCULAR

In the current virtual reality VR apparatus, due to the existence of the optical lens, the output image needs to be subjected to Counter-Distortion, which is usually performed by a Graphics Processing Unit (GPU). The counter-distortion performed by the GPU will cause delay inevitably. In general applications, the delay will not affect the visual experience. However, with the development of VR apparatus, higher and higher requirements are imposed on the rapid response of the apparatus. The delay will affect the user experience inevitably.

In addition, the resolution of the display screen of the VR apparatus is getting higher and higher, and the GPU needs to process more and more data, which imposes higher and higher requirements on performance and power consumption of the GPU. How to reduce or even eliminate pressure on the counter-distortion of the GPU appears very important.

SUMMARY

The present disclosure provides a picture processing method and device, so as to solve the problem of low efficiency of current counter-distortion processing.

In order to solve the above problem, the present disclosure discloses a picture processing method comprises: an integrated circuit chip IC receiving a to-be-processed picture sent by a graphics processor GPU; the IC pre-processing the to-be-processed picture; the IC performing counter-distortion process on the pre-processed picture; and the IC outputting the picture which is subjected to the counter-distortion process for display.

In an embodiment, the IC receiving a to-be-processed picture sent by a graphics processor GPU, comprising: the IC receiving a high-definition to-be-processed picture sent by the GPU and its data address, and storing the high-definition to-be-processed picture and its data address; and the IC receiving a low-definition to-be-processed picture sent by the GPU.

In an embodiment, the IC pre-processing the to-be-processed picture, comprising: performing an enlargement process on the low-resolution to-be-processed picture; identifying a to-be-processed region of the high-resolution to-be-processed picture according to the data address; performing low-definition process on the to-be-processed region; merging the high-definition to-be-processed picture which is subjected to low-definition process and the low-definition to-be-processed picture which is subjected to enlargement process.

In an embodiment, the high-definition to-be-processed picture which is subjected to low-definition process is elliptical or circular.

In an embodiment, performing low-definition process on the to-be-processed region comprises: extracting one pixel from the unit region in the to-be-processed region; duplicating the pixel within the unit region to replace the unit region.

In an embodiment, said merging the high-definition to-be-processed picture which is subjected to low-definition process and the low-definition to-be-processed picture which is subjected to enlargement process comprising: setting the high-definition to-be-processed picture which is subjected to low-definition process at the central position of the low-definition to-be-processed picture which is subjected to enlargement process for mergence; or setting the high-definition to-be-processed picture which is subjected to low-definition process at the human eye tracking position of the low-definition to-be-processed picture which is subjected to enlargement process for mergence.

In an embodiment, the IC receiving the to-be-processed picture sent by the GPU comprising: the IC receiving a to-be-processed picture sent by the GPU, the to-be-processed picture comprising a high-definition region and an edge low-definition region which is subjected to a compression process.

In an embodiment, the IC pre-processing the to-be-processed picture comprising: performing an enlargement process on the edge low-definition region of the to-be-processed picture.

In an embodiment, after the IC performing counter-distortion process on the pre-processed picture, the method further comprises: a vertical down sampling process is performed on the designated region corresponding to the edge low-definition region in the counter-distortion processed picture according to a preset index; said IC outputting the picture which is subjected to the counter-distortion process comprising: said IC outputting the vertical down sampling processed picture for display.

In an embodiment, the method further comprises: when displaying the vertical down sampling processed picture output by the IC, controlling a GOA unit to turn on simultaneously a plurality of rows in the designated region according to the preset index.

In order to solve the above problem, the present disclosure discloses a picture processing device, the device being disposed in an IC, the device comprising: an image receiving module, configured to receive a to-be-processed picture sent by a graphics processor GPU; and a pre-processing module, configured to pre-process the to-be-processed picture; a counter-distortion module, configured to perform counter-distortion process on the pre-processed picture; and an output module, configured to output a picture processed by the counter-distortion module for display.

In an embodiment, the image receiving module is configured to receive a high-definition to-be-processed picture sent by the GPU and its data address, and storing the high-definition to-be-processed picture and its data address; and receive a low-definition to-be-processed picture sent by the GPU.

In an embodiment, the pre-processing module comprises: an enlargement unit, configured to perform an enlargement process on the low-resolution to-be-processed picture; an identifying unit, configured to identify a to-be-processed region of the high-resolution to-be-processed picture according to the data address; a low-definition processing unit, configured to perform low-definition process on the to-be-processed region; and a merging unit, configured to merge the high-definition to-be-processed picture which is subjected to low-definition process and the low-definition to-be-processed picture which is subjected to enlargement process, wherein the high-definition to-be-processed picture which is subjected to low-definition process is elliptical or circular.

In an embodiment, the low-definition processing unit is configured to extract one pixel from the unit region in the to-be-processed region, and duplicate the pixel within the unit region to replace the unit region.

In an embodiment, the merging unit is configured to set the high-definition to-be-processed picture which is subjected to low-definition process at the central position of the low-definition to-be-processed picture which is subjected to enlargement process for mergence; or, set the high-definition to-be-processed picture which is subjected to low-definition process at the human eye tracking position of the low-definition to-be-processed picture which is subjected to enlargement process for mergence.

BRIEF DESCRIPTION OF THE DRAWINGS

FIG. 8A is a schematic diagram of a picture to be processed according to the present disclosure;

FIG. 8B is a schematic diagram of an edge low-definition region which is subjected to an enlargement process according to the present disclosure;

FIG. 8C is a schematic diagram of an edge low-definition region which is subjected to a vertical down-sampling process according to the present disclosure;

FIG. 9A is a schematic diagram of pixel distribution of an edge low-definition region which is subjected to a vertical down-sampling process according to the present disclosure;

FIG. 9B is a schematic diagram of an edge low-definition region which is subjected to a multiple-row-on process according to the present disclosure;

DETAILED DESCRIPTION OF THE EMBODIMENTS

As compared with the prior art, the present disclosure comprises the following advantages.

Firstly, the IC of the present disclosure performs a pre-process on a to-be-processed picture sent by the GPU, and performs a counter-distortion process on the pre-processed picture by using the IC, and the IC outputs the image which is subjected to the counter-distortion process, and displays it. Because the counter-distortion process is achieved in the IC, the workload of the GPU is reduced effectively, and the efficiency of the counter-distortion process is improved at the meantime.

Secondly, the to-be-processed picture according to the present disclosure is divided into a high-definition to-be-processed picture and a low-definition to-be-processed picture, and the GPU transmits respectively the high-definition to-be-processed picture and the low-definition to-be-processed picture to the IC for mergence, thereby effectively reducing data transmission bandwidth and transmission power consumption.

Of course, implementing any product of the present application does not necessarily require all of the advantages described above to be achieved at the same time.

To make the above-described objects, features and advantages of the present disclosure more apparent, further detailed explanations on the present disclosure will be made in connection with drawings and embodiments.

Embodiment 1

Figure 1:
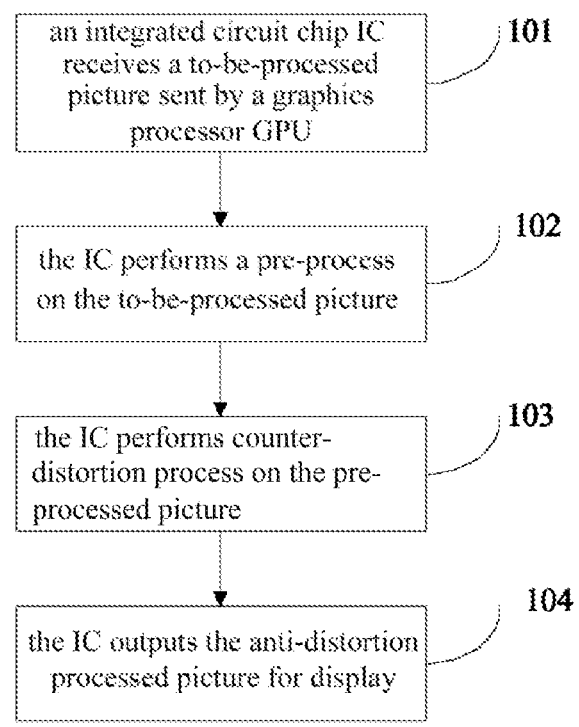
FIG. 1 is a flowchart of a picture processing method according to Embodiment 1 of the present disclosure.

Referring to FIG. 1, FIG. 1 is a flowchart of a picture processing method according to Embodiment 1 of the present disclosure, which specifically comprises: Step 101: An integrated circuit chip IC receives a to-be-processed picture sent by a graphics processor GPU.

The to-be-processed picture sent by the GPU comprises a high-definition to-be-processed picture and a low-definition to-be-processed picture, and the IC receives the high-definition to-be-processed picture sent by the GPU and its data address, and stores the high-definition to-be-processed picture and its data address.

In an actual application, the high-definition to-be-processed picture and its data address may be stored in the RAM of the IC, or may be stored in other positions, which is not limited by the present disclosure.

The IC receives a low-definition to-be-processed picture sent by the GPU.

Step 102: the IC processes the to-be-processed picture.

For example, the IC processes the to-be-processed picture comprises: Step 1021: an enlargement process is performed on the low-definition to-be-processed picture.

The IC may perform an enlargement process on the low-definition to-be-processed picture according to the resolution of the display screen, and simultaneously perform horizontal and vertical enlargement process on the to-be-processed picture, or perform only horizontal enlargement process or vertical enlargement process.

Figure 2A:
FIG. 2A is a schematic diagram of a low-definition to-be-processed picture according to the present disclosure.
Figure 2B:
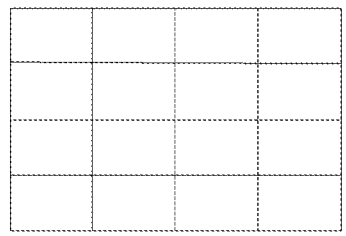
FIG. 2B is a schematic diagram of a low-definition image to be processed which is subjected to an enlargement process according to the present disclosure.

For example, the low-definition to-be-processed picture is as shown in FIG. 2A, and the low-definition to-be-processed picture in FIG. 2A are all enlarged by 4 times in both horizontal and vertical directions. The picture subjected to the enlargement process is as shown in FIG. 2B, in which a pixel of the low-definition to-be-processed picture is duplicated to 16 pixels without interpolation, which can reduce the resources occupied by the IC.

Step 1022: Identify a region to be processed of the high-definition to-be-processed picture according to the data address.

The region to be processed may specifically be an edge region in the high-definition to-be-processed picture.

Since the high-definition to-be-processed picture is stored in the RAM, it can be determined according to the data address whether the region to be processed of the high-definition to-be-processed picture needs to be low-definition processed. The data address is not the storage address in the RAM, but the data indicating the position of individual pixel in the high-definition picture. Since the center position of the high-definition to-be-processed picture is determined according to the eye tracking, the size of the high-definition to-be-processed picture is determined, the edge region in the high-definition to-be-processed picture can be determined. Since the data is sequentially stored when stored in the RAM, the position of the to-be-processed region of the high-definition to-be-processed picture may be determined. And the method for determining the position of the region to be processed in the RAM may be determined by the existing method and will not be described here.

Step 1023: perform a low-definition process on the to-be-processed region.

Figures 3, 4A, 4B:
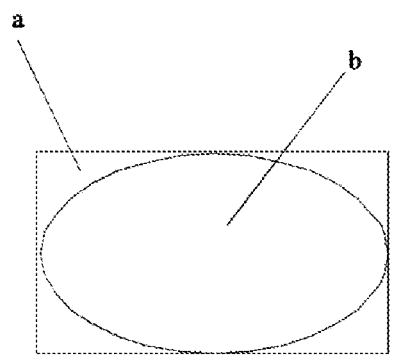
FIG. 3 is a schematic diagram of processing the high-definition image to be processed into an ellipse according to the present disclosure.
FIG. 4A is a schematic diagram of pixel distribution of a unit region in a region to be processed according to the present disclosure.
FIG. 4B is a schematic diagram of pixel duplication performed in the unit region according to the present disclosure.

Since the high-definition to-be-processed picture is square in the past, considering the visual characteristics of the human eye, the human eye has a wider field of view on the horizontal axis, so the high-definition to-be-processed picture may be processed into an ellipse or a circle, as shown in FIG. 3. The region a in FIG. 3 is a region to be processed, and the region to be processed comprises a plurality of unit regions, and the region b in FIG. 3 is a high-definition to-be-processed picture which is subjected to low-definition process.

In an actual application, low-definition process is performed on the region to be processed by the following method: extracting one pixel of the unit region in the region to be processed, and duplicating the pixel in the unit region to replace the unit region.

The region to be processed comprises a plurality of unit regions, and one unit region may comprise a plurality of pixels, such as, 16 pixels. The process on each unit region in the region to be processed can be performed in the manner shown in FIGS. 4A to 4B.

For example, taking the unit region in the region to be processed in the region a in FIG. 3 as an example, a process of performing low-definition process on the region to be processed is described.

FIG. 4A is a pixel distribution in a unit region, wherein the unit region is 16 pixels, which are 1-16 respectively. Then in the unit region, only one pixel is reserved per 16 pixels, for example, only pixel 1 is reserved. The pixel 1 is duplicated in the unit region to obtain FIG. 4B, and then the unit region is replaced with FIG. 4B.

It should be noted that the example is described by taking the reservation 1 as an example. In the actual operation, any pixel of 2-16 may be reserved, and then the pixel is duplicated, so that low-definition process is performed on the region to be processed. That is, the pixels of the region to be processed are reduced at the manner of pixel duplication.

Step 1024: merging the high-definition to-be-processed picture which is subjected to low-definition process with the low-definition to-be-processed picture which is subjected to enlargement process.

In an actual application, the high-definition to-be-processed picture which is subjected to low-definition process and the low-definition to-be-processed picture which is subjected to enlargement process are merged by the following method: the high-definition to-be-processed picture which is subjected to low-definition process is set at the central position of the low-definition to-be-processed picture which is subjected to enlargement process for mergence.

Figure 5:
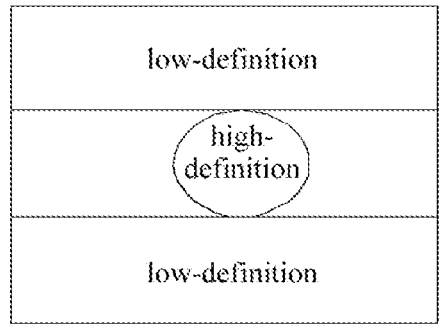
FIG. 5 is a schematic illustration of merging at a central position according to the present disclosure.

In general, the user's gaze point is in the middle of the picture. Therefore, the high-definition to-be-processed picture which is subjected to low-definition process may be set at the central position of the low-definition to-be-processed picture which is subjected to enlargement process for mergence, as shown in FIG. 5.

Alternatively, the high-definition to-be-processed picture which is subjected to low-definition process is set at the human eye tracking position of the low-definition to-be-processed picture which is subjected to enlargement process for mergence.

Figure 6:
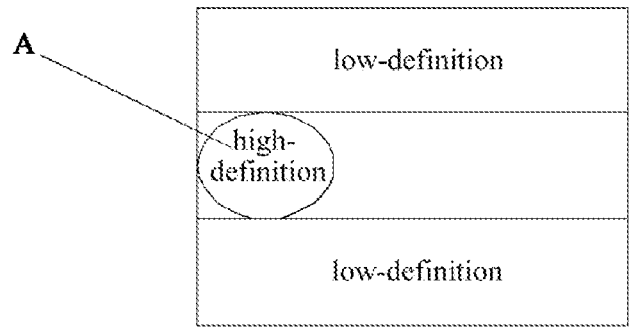
FIG. 6 is a schematic diagram of merging in accordance with the position tracked by the human eye according to the present disclosure.

In practical applications, the mergence can also be performed according to the human eye tracking position, as shown in FIG. 6, wherein the human eye tracking position is at the position shown in A of FIG. 6, so the high-definition to-be-processed picture which is subjected to low-definition process is set at the human eye tracking position of the low-definition to-be-processed picture which is subjected to enlargement process for mergence. The high-definition display is performed at the gaze point of the human eye, and the low-definition display is performed at the non-gaze region. This manner not only satisfies the vision requirement of human eye, but also decreases the data of pictures and reduces the power consumption required to transmit and process pictures.

Step 103: The IC performs counter-distortion process on the pre-processed picture.

In practical applications, the counter-distortion process can be performed on the pre-processed picture by the following ways.

One way is to use a polynomial fitting method to perform counter-distortion process on the processed image.

Another way is to use a grid method to perform counter-distortion process on the processed image.

Step 104: The IC outputs the picture which is subjected to counter-distortion process for display.

In practical applications, the IC can directly output the picture which is subjected to counter-distortion process and display it through the display panel, and can output the picture which is subjected to counter-distortion process output by the IC to the image processing BV3 module. The BV3 module processes the picture which is subjected to counter-distortion process, and then the processed picture is displayed on the display panel.

In this embodiment, firstly, the IC performs pre-process on the to-be-processed picture sent by the GPU and performs counter-distortion process on the pre-processed picture, and the IC outputs the picture which is subjected to counter-distortion process and displays it. Because the counter-distortion process is achieved in the IC, the workload of the GPU is reduced effectively, and the efficiency of the counter-distortion process is improved at the meantime.

Secondly, the to-be-processed picture according to the present disclosure is divided into a high-definition to-be-processed picture and a low-definition to-be-processed picture, and the GPU transmits respectively the high-definition to-be-processed picture and the low-definition to-be-processed picture to the IC for mergence, thereby effectively reducing data transmission bandwidth and transmission power consumption.

Embodiment 2

Figure 7:
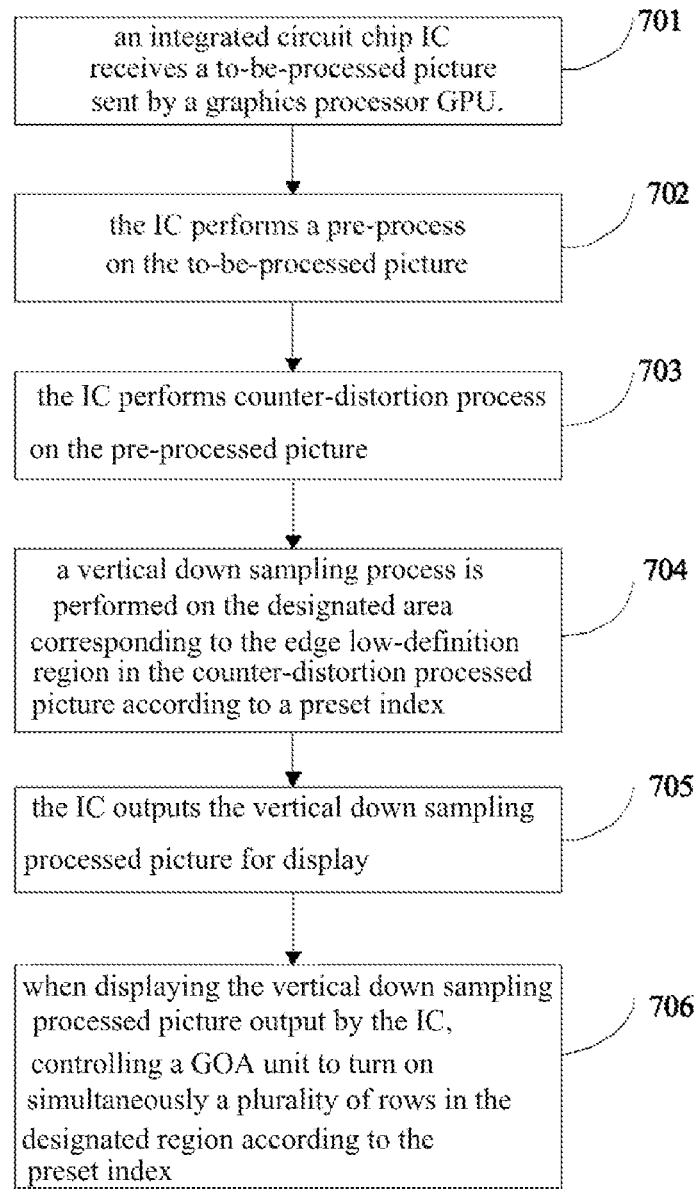
FIG. 7 is a flowchart of a picture processing method according to Embodiment 2 of the present disclosure.

Referring to FIG. 7, a flowchart of a picture processing method according to Embodiment 2 of the present disclosure comprises: Step 701: An integrated circuit chip IC receives a to-be-processed picture sent by a graphics processor GPU.

The IC receives the to-be-processed picture sent by the GPU, and the to-be-processed picture comprises a high-definition region and an edge low-definition region which is subjected to a compression process.

Step 702: The IC performs pre-process on the to-be-processed picture.

The IC performs pre-process on the to-be-processed picture comprising: performing an enlargement process on the edge low-definition region of the to-be-processed picture.

Since the edge low-definition region is subjected to compression process, it is necessary to enlarge the edge low-definition region. In practical applications, the IC can perform enlargement process according to the ratio of edge compression, and the IC can also perform enlargement process on the edge low-definition region based on the resolution of the display screen. The edge low-definition region may be enlarged in the horizontal and vertical directions simultaneously, and may be enlarged only in the horizontal direction or the vertical direction.

For example, the to-be-processed picture is a picture of 2K*2K, as shown in FIG. 8A, wherein the A region, the F region, and the C region are not high-definition regions, and the B region is a high-definition region. The F1 region, the F2 region, the F3 region, and the F4 region comprised in the F region are compressed by ¼ in the horizontal direction and the vertical direction, and the A1 region and the A2 region comprised in the A region are compressed by ¼ in the vertical direction. C1 region and the C2 region contained in the C region are compressed by ¼ in the horizontal direction. Since the A region, the F region, the C region, and the B region are compressed previously according to the foregoing manner, the edge low-definition region of the to-be-processed picture can be enlarged in this manner, and the enlarged pre-processed picture is a 4K*4K picture, as shown in FIG. 8B.

Step 703: The IC performs counter-distortion process on the pre-processed picture.

In practical applications, the counter-distortion process can be performed on the pre-processed picture by the following ways.

One way is to use a polynomial fitting method to perform counter-distortion process on the processed image.

Another way is to use a grid method to perform counter-distortion process on the processed image.

Step 704: A vertical down sampling process is performed on the designated region corresponding to the edge low-definition region in the counter-distortion processed picture according to a preset index.

Step 705: The IC outputs the vertical down sampling processed picture for display.

Step 706: When displaying the vertical down sampling processed picture output by the IC, a GOA unit is controlled to turn on simultaneously a plurality of rows in the designated region according to the preset index.

For example, after the picture shown in FIG. 8B is subjected to the process in step 703, the non-high-definition region is subjected to vertical ¼ down sampling to obtain a picture of 2K*4K shown in FIG. 8C.

In the 2K*4K picture shown in FIG. 8C, the F1 region, the F2 region, the F3 region, the F4 region, the A1 region, the A2 region, the C1 region, and the C2 region are all edge low-definition regions, and the B region is a high-definition region. Thus, it is necessary to turn on simultaneously multiple rows in the designated region of the edge low-definition region, and to turn on separately the high-definition region.

Figures 9A, 9B:
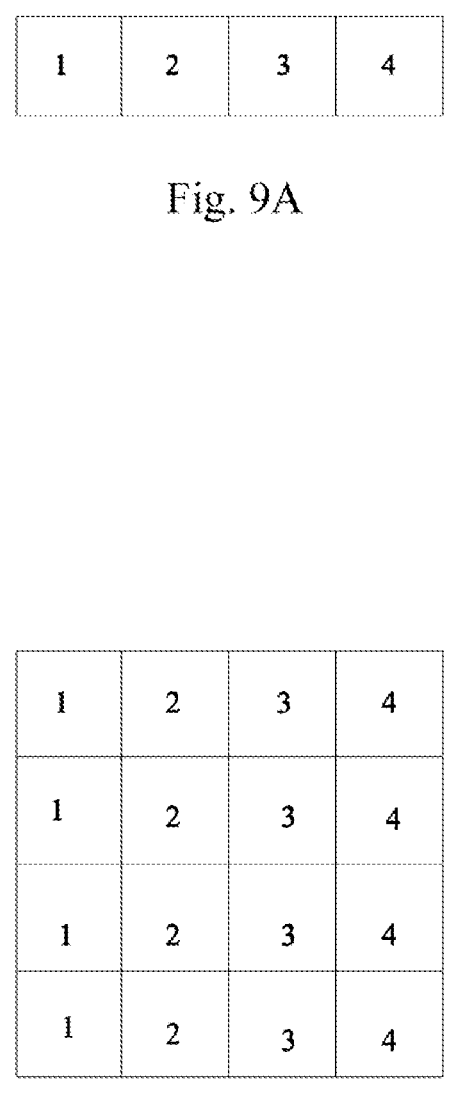

Taking the first row in FIG. 8C as an example, a method of performing vertical down sampling process on a designated region corresponding to the edge low-definition region according to a preset index will be described. For example, in the picture in the first row, there are 16 pixels, from 1-16, as shown in FIG. 4A. Reserving only one row of data per 4 rows, and performing vertical down sampling process, then FIG. 9A is obtained. A four-row-on process is performed on the first row, that is, a GOA circuit is controlled to simultaneously turn on the adjacent four rows of switches, and simultaneously charges the four rows of pixels. At this time, the display data of the four rows of pixels is the same, and the display effect is as shown in FIG. 9B. The third row in FIG. 8C also adopts the processing manner of the first row, and the single-row-on process is performed on the high-definition region, and after the above processing, the picture display from 2K*2K to 4K*2K is realized.

In this embodiment, the IC performs pre-process on the to-be-processed picture sent by the GPU, and performs counter-distortion process on the pre-processed picture. The IC outputs the picture which is subjected to the counter-distortion process and displays it. Because the counter-distortion process is achieved in the IC, the workload of the GPU is reduced effectively, and the efficiency of the counter-distortion process is improved at the meantime.

It should be noted that, for the foregoing method embodiments, for the sake of simple description, they are all expressed as a series of action combinations. However, those skilled in the art should understand that the present disclosure is not limited by the described action sequence, because in accordance with the present disclosure, certain steps may be performed in other sequences or concurrently. In addition, those skilled in the art should also understand that the embodiments described in the specification are all preferred embodiments, and the actions involved are not necessarily required by the present disclosure.

Based on the description of the foregoing method embodiments, the present disclosure further provides a corresponding device embodiment to implement the content described in the foregoing method embodiments.

Embodiment 3

Figure 10:
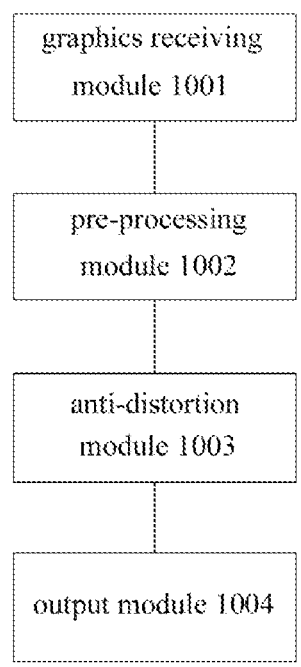
FIG. 10 is a structural block diagram of a picture processing device according to Embodiment 3 of the present disclosure.

FIG. 10 is a structural diagram of a picture processing device according to Embodiment 3 of the present disclosure. The device is disposed in an IC, and particularly comprises the following modules.

The graphics receiving module 1001 is configured to receive a to-be-processed picture sent by the graphics processor GPU.

The pre-processing module 1002 is configured to perform pre-process on the to-be-processed picture.

The counter-distortion module 1003 is configured to perform counter-distortion process on the pre-processed picture.

The output module 1004 is configured to output a picture processed by the counter-distortion module for display.

For example, the image receiving module is configured to receive the high-definition to-be-processed picture sent by the GPU and its data address, and store the high-definition to-be-processed picture and its data address.

In an actual application, the high-definition to-be-processed picture and its data address may be stored in the RAM of the IC, or may be stored in other positions, which is not limited by the present disclosure.

For example, the pre-processing module comprises: an enlargement unit, configured to perform an enlargement process on the low-resolution to-be-processed picture; and an identifying unit, configured to identify a to-be-processed region of the high-definition to-be-processed image according to the data address; a low-definition processing unit, configured to perform a low-definition process on the to-be-processed region, and a merging unit, configured to merge the high-definition to-be-processed picture which is subjected to low-definition process and the low-definition to-be-processed picture which is subjected to enlargement process, where the high-definition to-be-processed picture which is subjected to low-definition process is elliptical or circular.

The low-definition processing unit is configured to extract one pixel form the unit region in the to-be-processed region. The pixel is duplicated within the unit region to replace the unit region.

For example, the merging unit is configured to set the high-definition to-be-processed picture which is subjected to low-definition process at the central position of the low-definition to-be-processed picture which is subjected to enlargement process for mergence; or set the high-definition to-be-processed picture which is subjected to low-definition process is set at the human eye tracking position of the low-definition to-be-processed picture which is subjected to enlargement process for mergence.

In this embodiment, firstly, the IC performs a pre-process on a to-be-processed picture sent by the GPU, and performs a counter-distortion process on the pre-processed picture by using the IC, and the IC outputs the image which is subjected to the counter-distortion process, and displays it. Because the counter-distortion process is achieved in the IC, the workload of the GPU is reduced effectively, and the efficiency of the counter-distortion process is improved at the meantime.

Secondly, the to-be-processed picture according to the present disclosure is divided into a high-definition to-be-processed picture and a low-definition to-be-processed picture, and the GPU transmits respectively the high-definition to-be-processed picture and the low-definition to-be-processed picture to the IC for mergence, thereby effectively reducing data transmission bandwidth and transmission power consumption.

Embodiment 4

Figure 11:
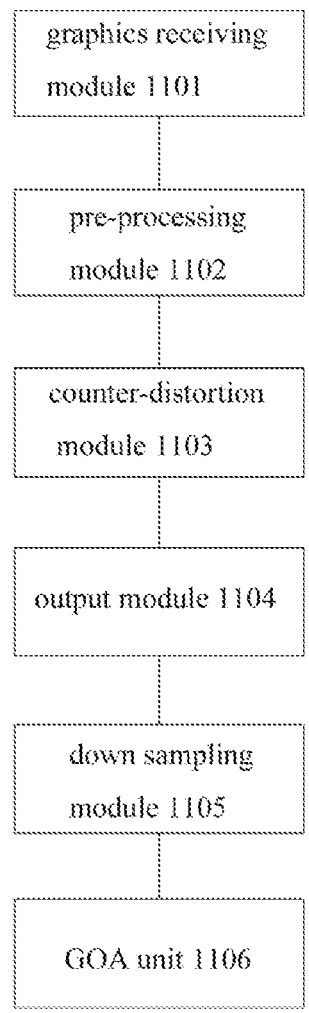
FIG. 11 is a structural block diagram of a picture processing device according to Embodiment 4 of the present disclosure.

FIG. 11 is a structural diagram of a picture processing device according to Embodiment 4 of the present disclosure. The device is disposed in an IC, and particularly comprises the following modules.

The graphics receiving module 1101 is configured to receive a to-be-processed picture sent by the graphics processor GPU.

The pre-processing module 1102 is configured to perform pre-process on the to-be-processed picture.

The counter-distortion module 1103 is configured to perform counter-distortion process on the pre-processed picture.

The output module 1104 is configured to output a picture processed by the counter-distortion module for display.

For example, the graphics receiving module is configured to receive a to-be-processed picture sent by the GPU, where the to-be-processed picture comprises a high-definition region and an edge low-definition region which is subjected to a compression process.

For example, the pre-processing module is configured to perform an enlargement process on the edge low-definition region of the to-be-processed picture.

For example, the device further comprises: a down sampling module 1105, configured to perform a vertical down sampling process on the designated region corresponding to the edge low-definition region in the counter-distortion processed picture according to a preset index.

The output module is further configured to output a picture which is subjected to the vertical down sampling process by the IC for display.

For example, the device further comprises: a GOA unit 1106, which is configured to control the GOA unit to turn on simultaneously a plurality of rows in the designated region according to the preset index when displaying the vertical down sampling processed picture output by the IC.

In this embodiment, the IC performs pre-process on the to-be-processed picture sent by the GPU, and performs counter-distortion process on the pre-processed picture by using the IC, and the IC outputs the picture which is subjected to the counter-distortion processing, and displays it. Because the counter-distortion process is achieved in the IC, the workload of the GPU is reduced effectively, and the efficiency of the counter-distortion process is improved at the meantime.

For the above device embodiment, since it is basically similar to the method embodiment, the description is relatively simple, and a part of the description of the method embodiment may be used.

The various embodiments in the present specification are described in a progressive manner, and each embodiment focuses on differences from other embodiments, and the same or similar parts of the various embodiments can be referred to each other.

It will be readily apparent to those skilled in the art that any combination of the above various embodiments is possible, and any combination among the above embodiments is an embodiment of the present disclosure, but will not be described in detail here due to space limitations.

In the present disclosure, "component", "device", "system" and the like refer to related entities applied to a computer, such as hardware, a combination of hardware and software, software or software in execution, and the like. In particular, for example, a component can be, but is not limited to be, a process running on a processor, a processor, an object, an executable component, a thread of execution, a program and/or a computer. Also, an application or script running on a server, or a server, can be a component. One or more components can be executed in a process and/or a thread, and the components can be localized on a single computer and/or distributed among two or more computers, and can be run by various computer readable media. The component may also perform communication via local and/or remote processes based on signals having one or more data packets, for example, from a signal interacting with another component in the local system or the distributed system, and/or interacting with other systems over the Internet.

Finally, it should also be noted that in this context, relational terms such as first and second are used merely to distinguish one entity or operation from another entity or operation, and do not necessarily require or imply that there is any such actual relationship or order among these entities or operations. Moreover, the terms "comprising" and "comprising" are intended to comprise not only those elements, but also other elements that are not explicitly listed, or the elements that are inherent to the process, method, article, or apparatus. An element that is defined by the phrase "comprising", without any more limitation, does not exclude the presence of additional elements in the process, method, article, or apparatus.

Moreover, "and/or" in the above means that both the relationship of "and" and the relationship of "or" are comprised herein, wherein: if the relationship between the scheme A and the scheme B is "and", it indicates an embodiment in which the scheme A and the scheme B may be comprised at the same time; if the relationship between the scheme A and the scheme B is "or", it means that the scheme A may be separately comprised in an embodiment, or the scheme B may be separately comprised.

While the preferred embodiment of the present disclosure has been described, those skilled in the art can make further changes and modifications to these embodiments, once the basic inventive concept is known. Therefore, the appended claims are intended to be interpreted as comprising the preferred embodiments and all modifications and changes falling into the scope of the present disclosure.

The above is a detailed explanation on a method and an apparatus for processing a picture according to the present disclosure. The principles and embodiments of the present disclosure are described herein by using specific examples. The explanation on the above embodiments is only used for helping to understand the method and its core concept of the present disclosure; at the same time, those skilled in the art, according to the concept of the present disclosure, may make any change in the specific embodiment and the scope of application. In summary, the contents of this specification should not be construed as restrictions to the present application.

The present disclosure claims priority to Chinese Patent Application No. 201711298687.1, filed on Dec. 8, 2017, the entire disclosure of which is hereby incorporated in full text by reference as part of the present application.

What is claimed is:

1. A picture processing method, comprises:
    an integrated circuit chip IC receiving a to-be-processed picture sent by a graphics processor GPU;
    the IC pre-processing the to-be-processed picture;
    the IC performing counter-distortion process on the pre-processed picture; and
    the IC outputting the picture which is subjected to the counter-distortion process for display, wherein the IC pre-processing the to-be-processed picture, comprising:
    performing an enlargement process on a low-definition to-be-processed picture;
    identifying a to-be-processed region of a high-definition to-be-processed picture according to its data address;
    performing low-definition process on the to-be-processed region;
    merging a high-definition to-be-processed picture which is subjected to low-definition process and a low-definition to-be-processed picture which is subjected to enlargement process.

2. The method according to claim 1, wherein the IC receiving a to-be-processed picture sent by a graphics processor GPU, comprising:
    the IC receiving the high-definition to-be-processed picture sent by the GPU and its data address, and storing the high-definition to-be-processed picture and its data address; and
    the IC receiving the low-definition to-be-processed picture sent by the GPU.

3. The method according to claim 1, wherein the high-definition to-be-processed picture which is subjected to low-definition process is elliptical or circular.

4. The method according to claim 1, wherein performing low-definition process on the to-be-processed region comprises:
    extracting one pixel from the sub-circuit region in the to-be-processed region;
    duplicating the pixel within the sub-circuit region to replace the sub-circuit region.

5. The method according to claim 1, wherein merging the high-definition to-be-processed picture which is subjected to low-definition process and the low-definition to-be-processed picture which is subjected to enlargement process comprising:
    setting the high-definition to-be-processed picture which is subjected to low-definition process at the central position of the low-definition to-be-processed picture which is subjected to enlargement process for mergence; or
    setting the high-definition to-be-processed picture which is subjected to low-definition process at the human eye tracking position of the low-definition to-be-processed picture which is subjected to enlargement process for mergence.

6. The method according to claim 1, wherein the IC receiving the to-be-processed picture sent by the GPU comprising:
    the IC receiving a to-be-processed picture sent by the GPU, the to-be-processed picture comprising a high-definition region and an edge low-definition region which is subjected to a compression process.

7. The method according to claim 1, wherein the IC pre-processing the to-be-processed picture comprising:
    performing an enlargement process on the edge low-definition region of the to-be-processed picture.

8. The method according to claim 1, wherein after the IC performing counter-distortion process on the pre-processed picture, the method further comprises:
    a vertical down sampling process is performed on the designated region corresponding to the edge low-definition region in the counter-distortion processed picture according to a preset index;
    said IC outputting the picture which is subjected to the counter-distortion process comprising:
    said IC outputting the vertical down sampling processed picture for display.

9. The method according to claim 8, wherein the method further comprises:
    when displaying the vertical down sampling processed picture output by the IC, controlling a GOA unit to turn on simultaneously a plurality of rows in the designated region according to the preset index.

10. A picture processing device, the device being disposed in an IC, the device comprising:
    an image receiving circuit, configured to receive a to-be-processed picture sent by a graphics processor GPU; and
    a pre-processing circuit, configured to pre-process the to-be-processed picture;
    a counter-distortion circuit, configured to perform counter-distortion process on the pre-processed picture; and
    an output circuit, configured to output a picture processed by the counter-distortion circuit for display,
    wherein the pre-processing circuit comprises:

an enlargement sub-circuit, configured to perform an enlargement process on a low-definition to-be-processed picture;
an identifying sub-circuit, configured to identify a to-be-processed region of a high-definition to-be-processed picture according to its data address;
a low-definition processing sub-circuit, configured to perform low-definition process on the to-be-processed region;
a merging sub-circuit, configured to merge a high-definition to-be-processed picture which is subjected to low-definition process and a low-definition to-be-processed picture which is subjected to enlargement process.

11. The device of claim 10, wherein the image receiving circuit is configured to receive the high-definition to-be-processed picture sent by the GPU and its data address, and storing the high-definition to-be-processed picture and its data address; and
receive the low-definition to-be-processed picture sent by the GPU.

12. The device according to claim 10, wherein the high-definition to-be-processed picture which is subjected to low-definition process is elliptical or circular.

13. The device according to claim 12, wherein the low-definition processing sub-circuit is configured to extract one pixel from the sub-circuit region in the to-be-processed region, and duplicate the pixel within the sub-circuit region to replace the sub-circuit region.

14. The device according to claim 12, wherein the merging sub-circuit is configured to set the high-definition to-be-processed picture which is subjected to low-definition process at the central position of the low-definition to-be-processed picture which is subjected to enlargement process for mergence; or, set the high-definition to-be-processed picture which is subjected to low-definition process at the human eye tracking position of the low-definition to-be-processed picture which is subjected to enlargement process for mergence.

15. The method according to claim 2, wherein the IC pre-processing the to-be-processed picture, comprising:
performing an enlargement process on the low-definition to-be-processed picture;
identifying a to-be-processed region of the high-definition to-be-processed picture according to the data address;
performing low-definition process on the to-be-processed region;
merging the high-definition to-be-processed picture which is subjected to low-definition process and the low-definition to-be-processed picture which is subjected to enlargement process.

16. The method according to claim 2, wherein the IC pre-processing the to-be-processed picture comprising:
performing an enlargement process on the edge low-definition region of the to-be-processed picture.

17. The method according to claim 2, wherein after the IC performing counter-distortion process on the pre-processed picture, the method further comprises:
a vertical down sampling process is performed on the designated region corresponding to the edge low-definition region in the counter-distortion processed picture according to a preset index;
said IC outputting the picture which is subjected to the counter-distortion process comprising:
said IC outputting the vertical down sampling processed picture for display.

18. The device according to claim 11, wherein the pre-processing circuit comprises:
an enlargement sub-circuit, configured to perform an enlargement process on the low-definition to-be-processed picture;
an identifying sub-circuit, configured to identify a to-be-processed region of the high-definition to-be-processed picture according to the data address;
a low-definition processing sub-circuit, configured to perform low-definition process on the to-be-processed region; and
a merging sub-circuit, configured to merge the high-definition to-be-processed picture which is subjected to low-definition process and the low-definition to-be-processed picture which is subjected to enlargement process, wherein the high-definition to-be-processed picture which is subjected to low-definition process is elliptical or circular.

19. The device according to claim 13, wherein the merging sub-circuit is configured to set the high-definition to-be-processed picture which is subjected to low-definition process at the central position of the low-definition to-be-processed picture which is subjected to enlargement process for mergence; or, set the high-definition to-be-processed picture which is subjected to low-definition process at the human eye tracking position of the low-definition to-be-processed picture which is subjected to enlargement process for mergence.

* * * * *